United States Patent
Myhre

(10) Patent No.: US 6,660,193 B2
(45) Date of Patent: Dec. 9, 2003

(54) METHOD OF MANUFACTURING A LENS FOR MICROWAVE FREQUENCIES

(75) Inventor: John D. Myhre, Western Springs, IL (US)

(73) Assignee: Andrew Corporation, Orland Park, IL (US)

( * ) Notice: Subject to any disclaimer, the term of this patent is extended or adjusted under 35 U.S.C. 154(b) by 116 days.

(21) Appl. No.: 09/970,141

(22) Filed: Oct. 3, 2001

(65) Prior Publication Data

US 2003/0062639 A1 Apr. 3, 2003

(51) Int. Cl.[7] .................. B29D 11/00; B28B 11/06; B28B 11/16
(52) U.S. Cl. ............... 264/1.32; 264/101; 264/109; 264/128; 264/260
(58) Field of Search ................ 264/109–128, 264/1.1–2.7, 101, 260

(56) References Cited

U.S. PATENT DOCUMENTS

| | | |
|---|---|---|
| 2,716,190 A | 8/1955 | Baker |
| 2,956,281 A | 10/1960 | McMillan et al. |
| 3,256,373 A | 6/1966 | Horst |
| 3,359,560 A | 12/1967 | Horst |
| 3,866,234 A | 2/1975 | Gates, Jr. et al. |
| 3,917,773 A | 11/1975 | Gates, Jr. et al. |
| 4,288,337 A | 9/1981 | Ota et al. |
| 4,482,513 A | 11/1984 | Auletti |
| 5,096,551 A | 3/1992 | Schoen, Jr. et al. |
| 5,170,167 A | 12/1992 | Rix et al. |
| 5,223,568 A * | 6/1993 | Landi et al. ............. 428/625 |

* cited by examiner

*Primary Examiner*—Stephen J. Lechert, Jr.
(74) *Attorney, Agent, or Firm*—Welsh & Katz

(57) ABSTRACT

A method of manufacturing a microwave antenna lens includes the provision of a mold that has a lens defining cavity formed therein. The shape of the lens defining cavity is predetermined. The lens defining cavity is filled with a suitable filler material such as, for example, microspheres of a certain dielectric constant. A quantity of a resin is introduced into the lens defining cavity to fill the interstices between the individual pieces of filler material. Then, after the resin is cured, a microwave lens if formed.

26 Claims, 4 Drawing Sheets

METHOD OF MANUFACTURING A LENS FOR MICROWAVE FREQUENCIES

BACKGROUND OF THE INVENTION

The present invention generally relates to microwave antennas and, more particularly, to a method for manufacturing a lens for use in a microwave antenna.

Various types of dielectric materials have been in use for a number of years. In one example, U.S. Pat. No. 2,716,190 to E. B. Baker discloses a "dielectric material." This patent states that the invention disclosed therein relates to a dielectric material that consists essentially of small metal particles that are dispersed in a polymerized plastic matrix. The patent also states that the lens shown in FIGS. 1–2 of the patent has variations in dielectric constant that are achieved by compression molding the lens from a composite preform made from various samples of polystyrene containing differing proportions of aluminum or magnesium. The content of this patent is incorporated by reference into this application as if fully set forth herein.

In another example, U.S. Pat. No. 2,956,281 to E. B. McMillan et al. discloses "dielectric walls for transmission of electromagnetic radiation." The patent states that one example of such a dielectric wall is a dielectric sheet wherein the dielectric constant increases from the faces to the interior. The content of this patent is incorporated by reference into this application as if fully set forth herein.

Dielectric materials have been utilized in a variety of different applications. One such example is U.S. Pat. No. 3,256,373 to R. L. Horst that discloses a "method of forming a cylindrical dielectric lens." The patent states that the present invention disclosed therein contemplates the fabrication of a body of continuously varying dielectric constant material that is formed from, in one example, an artificial dielectric that consists of an array of randomly oriented metallic particles that are supported by a low density dielectric material. The content of this patent is incorporated by reference into this application as if fully set forth herein.

U.S. Pat. No. 3,359,560 to R. L Horst discloses a "cylindrical dielectric lens" is yet another example of the use of dielectric material. This patent states that a microwave lens comprises a mass of dielectric beads supporting an array of randomly oriented insulated metallic slivers in the interstices between the beads. This patent also states that the concentration of slivers in the mass of beads is varied in certain desired directions to produce a smooth and continuous gradation in dielectric constant in these directions. The content of this patent is incorporated by reference into this application as if fully set forth herein.

U.S. Pat. No. 3,866,234 to Gates, Jr. et al. discloses a "shaped ceramic dielectric antenna lens." This patent states that one of the features of the invention disclosed in this patent is the provision of a rigidly-shaped lens body that is formed of a quantity of porous granules which are fused one to the other to provide the rigidity, each of the granules being essentially uniform in composition and size, and further having a pore size that is smaller than a minimum wavelength of the energy band to be transmitted. The content of this patent is incorporated by reference into this application as if fully set forth herein.

U.S. Pat. No. 3,917,773 to Gates, Jr. et al. discloses a "method for fabricating a shaped dielectric antenna lens." This patent states that a quantity of porous granules is formed from a particular ceramic composition which can be controlled to adjust the dielectric constant, the specific gravity, the hardness, and the temperature resistance of the lens formed by the granules. The content of this patent is incorporated by reference into this application as if fully set forth herein.

U.S. Pat. No. 4,288,337 to Ota et al. discloses "lightweight materials having a high dielectric constant and their method of manufacture." This patent states that such materials are manufactured by mixing metal-coated expanded particles of plastic, glass or silica, thin-wall metal pipes or metal coated thin-wall plastic pipes and uncoated expanded particles of plastic, glass or silica, and then forming the resulting mixture into a desired shape by a thermal expansion process. The content of this patent is incorporated by reference into this application as if fully set forth herein.

U.S. Pat. No. 4,482,513 to Auletti discloses a "method of molding foam/aluminum flake microwave lenses." The patent states that such lenses are formed by preheating a mold that has a cavity of an appropriate configuration defined therein, filing the mold with a mixture of low density polyurethane foam components and fine aluminum flakes that are evenly distributed throughout the foam structure, and allowing the mixture to cool. The content of this patent is incorporated by reference into this application as if fully set forth herein.

U.S. Pat. No. 5,096,551 to Schoen, Jr. et al. discloses a "metallized tubule-based artificial dielectric." This patent states that dielectric composites are formed by incorporating metallized particles having a high aspect ratio (such as metallized phospholipid tubules) in a polymeric and/or ceramic matrix, and then curing or sintering the resulting products in an electric or magnetic field to align the particles. The content of this patent is incorporated by reference into this application as if fully set forth herein.

U.S. Pat. No. 5,170,167 to Rix et al. discloses a "reflector for electromagnetic energy." The patent states that such reflectors include two lenses that are arranged such that electromagnetic energy from a source incident on the first lens is refracted onto the second lens and then is reflected from a reflective coating back towards the energy source. The patent states that the lenses are molded from silica flour in a polyester resin binder. The content of this patent is incorporated by reference into this application as if fully set forth herein.

Lens for use in microwave antennas typically are very hard to manufacture. One reason for this is that the typical aspect ratio and size of such a lens are very large. For example, a typical lens can be over twelve inches in diameter, three inches thick in the middle, and have sides that taper down to sharp edges. There is a continuing need for improved methods of manufacturing such lenses.

SUMMARY OF THE INVENTION

An exemplary microwave antenna lens is manufactured by providing a mold having a lens defining cavity formed therein, the shape of which is predetermined for a given application. The lens defining cavity is filled with a suitable filler material such as, for example, microspheres. A quantity of a resin is introduced into the lens defining cavity and fills the interstices between the individual pieces of filler material. Then, after the resin is cured, a microwave antenna is formed.

One aspect of the present invention is to provide certain protection for microwave lens that are manufactured. In one example, a thin film of a weatherable polymer is placed into the mold before the filler material and resin are introduced therein. A unitary mass is formed as the resin is cured.

In a further development of the invention, the polymer thin film is preformed to the proper shape that corresponds to the shape of the microwave lens to be formed, and is utilized in place of a separate mold. In this regard, the filler material and resin is introduced, in one exemplary application, directly into an interior space of the preformed thin film. One technique of forming the film is a thermoforming process. A further technique would be to precoat the surface of the mold with a resin that would harden to a film. This further technique can be performed, if desired, after a microwave lens is molded.

Certain features and advantages of the invention will become apparent from the description that follows.

BRIEF DESCRIPTION OF THE DRAWINGS

The objects and advantages of the present invention will become more readily apparent to those of ordinary skill in the relevant art after reviewing the following detailed description and accompanying drawings, wherein.

DETAILED DESCRIPTION OF AN ILLUSTRATIVE EMBODIMENT

Figure 1:
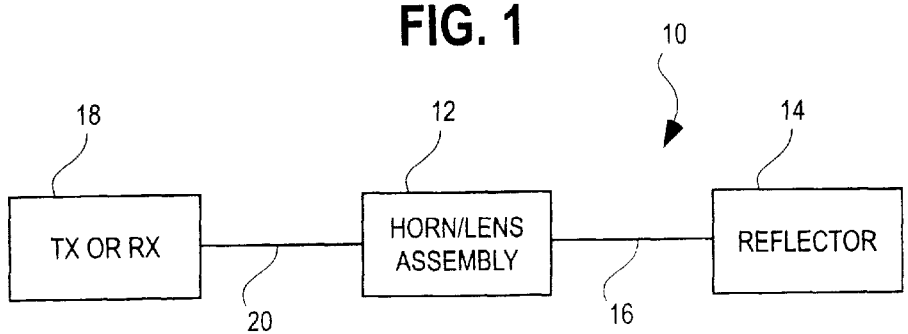
FIG. 1 is a schematic block diagram that illustrates a microwave antenna that incorporates certain exemplary aspects of the present invention disclosed herein.

While the present invention is susceptible of embodiment in various forms, there are shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of an Illustrative Embodiment") relates to a requirement of the United States Patent Office, and should not be found to limit the subject matter disclosed herein.

BRIEF DESCRIPTION OF THE DRAWINGS

Referring to FIG. 1, a schematic block diagram of a microwave antenna that incorporates certain exemplary aspects of the present invention disclosed herein is shown. In the illustrated embodiment of the invention, a microwave antenna 10 includes a horn and lens assembly 12 and a reflector 14 that is operatively coupled thereto via transmission pathway 16. It should be understood by those of ordinary skill in the relevant art that the reflector 14 is an optional component of microwave antenna 10 and, therefore, is not required for use in connection with the present invention that is disclosed in this application.

The exemplary transmitter/receiver device 18 is operatively electrically connected to the horn and lens assembly 12 by means of connection 20. When the microwave antenna 10 is used to transmit microwave energy, the horn and lens assembly 12 directs a microwave signal towards a microwave reflector 14 that redirects the microwave signal in a predetermined direction that depends upon the physical characteristics of the reflector 14. When the microwave antenna 10 is used to receive a microwave signal, the horn and lens assembly 12 receives a microwave signal that is directed towards it by reflector 14.

Figure 2:
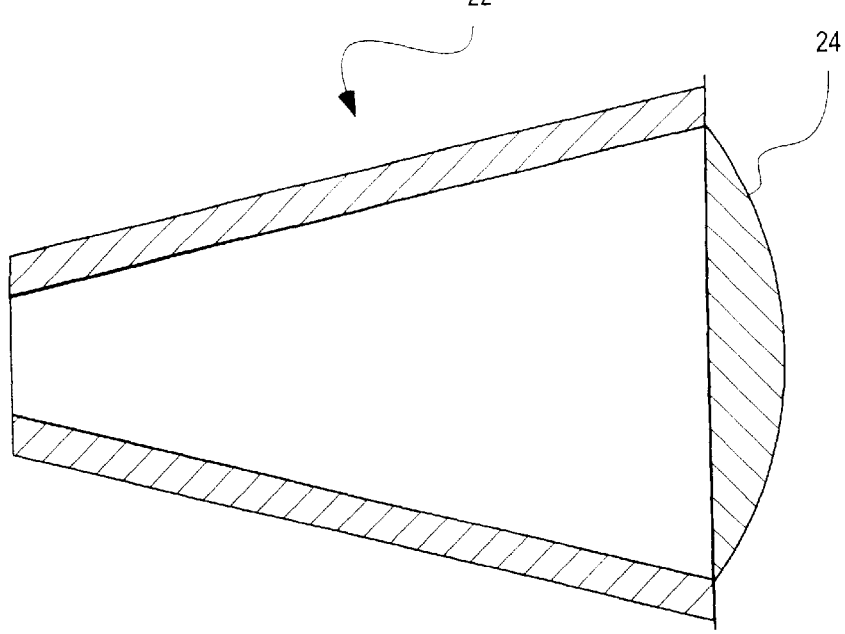
FIG. 2 is a cross-sectional view of a metallic horn and lens that forms a portion of the microwave antenna shown in FIG. 1.

Referring to FIG. 2, a cross-sectional, schematic representation of one example of a horn and lens assembly 12 that is suitable for use in connection with microwave antenna 10 is illustrated. In the illustrated embodiment of the invention, the horn and lens assembly 12 includes a metallic horn 22.

It should be noted that only the inner surface of the horn 22 needs to be metallic. So, the horn itself can be metallic, or it can have a conductively-coated inner surface. It also should be noted that the shape of the metallic horn 22 illustrated in FIG. 2 is exemplary in nature, and is not intended to be limiting to the scope of the invention disclosed in this application. For example, in some applications, absorber or shaped ridges (or other items to improve the performance) are provided in the horn 22.

A microwave lens 24 is affixed to an end of the metallic horn 22 as shown in FIG. 2. The purpose of the microwave lens 24 is utilized to generally focus microwave signals that pass through the lens in connection with the transmission and reception of microwave signals by the microwave antenna 10.

Figure 3A:
FIGS. 3A–3B are cross-sectional views of two lens that are useable with the microwave antenna shown in FIG. 1.
Figure 3B:
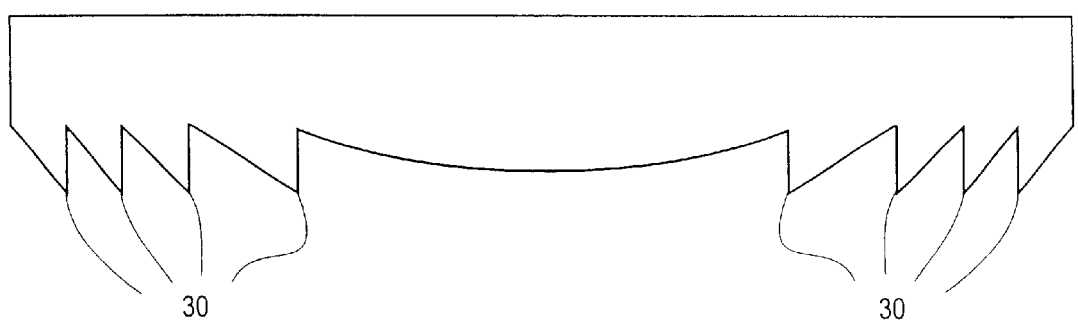

Referring to FIGS. 3A–3B, cross-sectional views of two lens that can be used in connection with the microwave antenna 10 shown in FIG. 1 are illustrated. FIG. 3A illustrates a microwave lens 26 that has an exemplary curvature for microwave transmission purposes. FIG. 3B illustrates a fresnel lens 28 that has a number of segments 30 that allow the fresnel lens 28 to have generally the same microwave refraction properties as the microwave lens 26, but with a substantially reduced thickness. This is a desirable characteristic in some microwave antenna applications as is readily apparent to those of ordinary skill in the relevant art.

Figure 4:
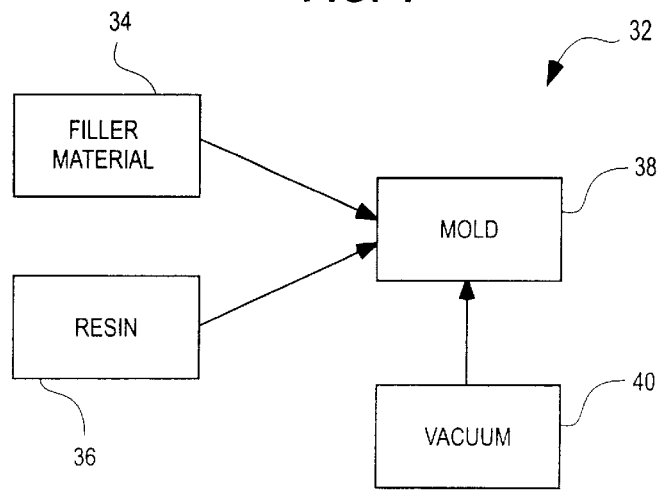
FIG. 4 is a schematic block diagram of an exemplary molding apparatus that is used to manufacture the lens that forms a portion of the microwave antenna shown in FIG. 1.

Referring to FIG. 4, a schematic block diagram of an exemplary molding apparatus that can be used to manufacture a microwave antenna lens in accordance with a number of aspects of the present invention disclosed herein is illustrated. In the embodiment of the present invention illustrated in FIG. 4, a molding apparatus 32 includes a source of filler material 34 and a source of resin 36 that operatively interact with a mold 38 to allow microwave lens to be manufactured as discussed in greater detail hereinafter. If desired, a vacuum system 40 can be operably coupled to the mold 38 to assist in the dispersion of resin inside the mold 38.

Exemplary filler materials that are suitable for use in connection with the present invention include, for example, sand, granular quartz, and microspheres that are commercially available on the open market in a variety of forms. For example, the most common form of microspheres is glass beads, which is a completely solid material. The glass that forms such microspheres can be of several types that vary from common soda glass to pure quartz. As an additional example, hollow microspheres (that are extensively used in the casting industry to make parts that are lighter than pure resin) can be utilized in connection with filler material source 34. As yet a further example, microspheres can be made from ceramic materials such as alumina and zirconia, as well as certain plastic materials.

Exemplary characteristics of microspheres that render them suitable for use in connection with the present invention include the fact that they have minimal effect on the viscosity of a resin and the fact that they allow very high loadings of fillers that can still be poured. Furthermore, due to their generally spherical shape, microspheres "roll" past each other without getting stuck, thereby allowing microwave lens of various shapes to be formed with a reduced amount of "lossy" resin as discussed in greater detail hereinafter.

Figure 5:
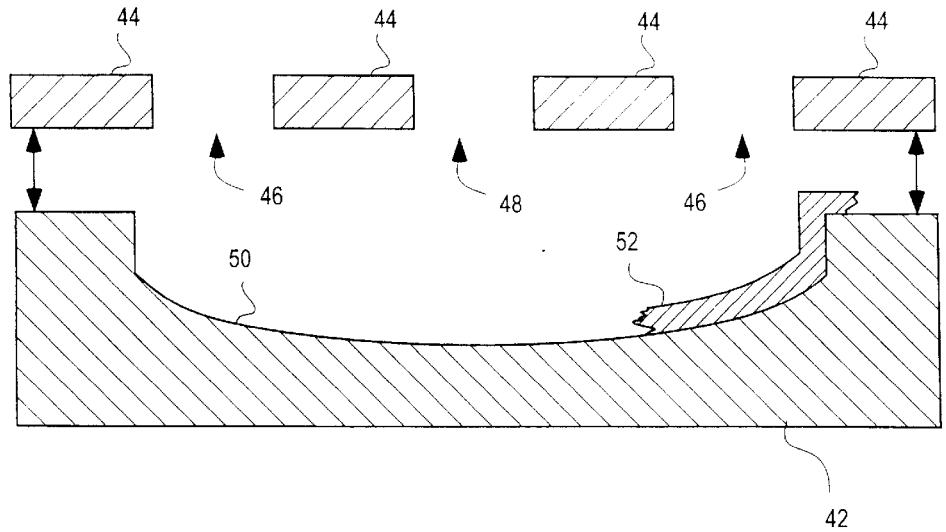
FIG. 5 is a cross-sectional view of an exemplary mold half having a lens defining cavity formed therein that forms a portion of the mold shown in FIG. 4.

FIG. 5 is a cross-sectional view of an exemplary mold that may be used in connection with the molding apparatus shown in FIG. 4. In the illustrated embodiment of the invention shown in FIG. 5, mold 38 includes a mold base 42 and a mold cover 44 that is operably detachably coupled to mold base 42. Mold cover 44 may include one or more vents 46 (two of which are shown in FIG. 5) to allow air to escape as the mold is filled.

Figure 5A:
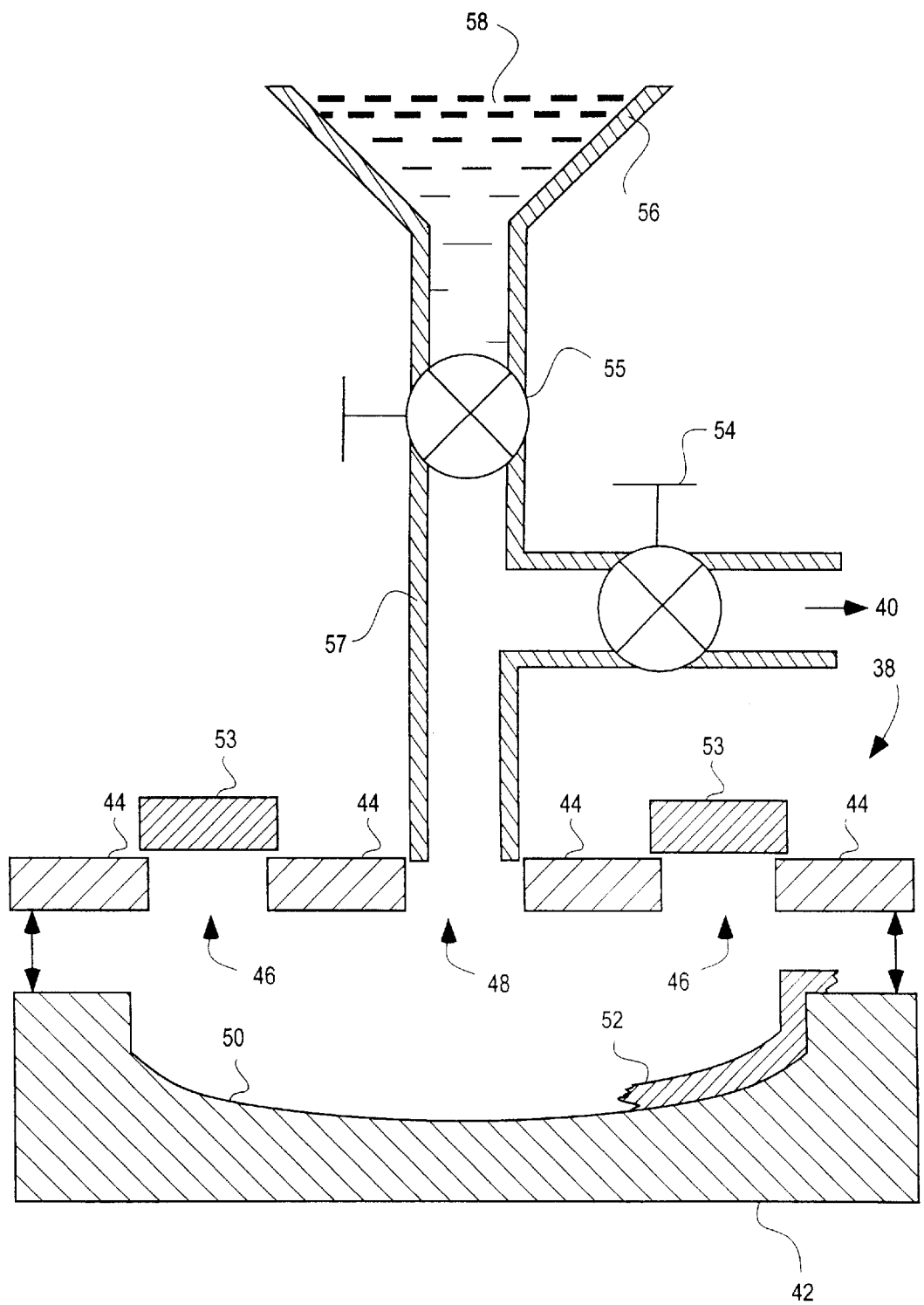
FIG. 5A is a cross-sectional view of a second exemplary mold that may be used in connection with the apparatus shown in FIG. 4.

FIG. 5A, illustrates a further exemplary mold that may be used to manufacture microwave antenna lenses in accordance with aspects of this invention. In the illustrated embodiment of this aspect of the present invention, the ports 46 are closed off using plugs 53, and a vacuum 40 pulled via inlet port 48 and the three-armed tubing 57, with valve 54 being open to the vacuum. Valve 55 is closed at the start, preventing resin 58 held in reservoir 56 from flowing into the tee. After the vacuum has been created, valve 54 is closed and valve 55 opened allowing the resin to flow into the mold. The resin is typically forced by the normal atmospheric pressure but, if desired, additional pressure can be placed on the resin to speed the flow.

A lens defining cavity 50 is defined between mold base 42 and mold cover 44 as shown in FIG. 5. In the embodiment of the invention shown in FIG. 5, the lens defining cavity 50 is formed to have a shape that corresponds to the microwave lens 26 that is shown in FIG. 3A. However, it should be understood and appreciated by those of ordinary skill in the relevant art that the shaped of the lens defining cavity 50 of mold 38 is not limited to the shape shown in FIG. 3A, that it can be formed in the shape shown in FIG. 3B, and that its shape corresponds to a particular microwave lens application.

The following procedure may be used to form a microwave lens in accordance with certain aspects of the present invention disclosed herein. First, the mold cover 44 is affixed to the mold base 42. After this, a predetermined quantity of a filler material (such as, for example, solid microspheres that are formed from pure quartz) is inserted into the lens defining cavity 50 through insertion port 48. Alternatively, the filler material can be introduced into the portion of the lens defining cavity 50 that is defined by mold base 44 when the mold cover 44 is not connected to mold base 44.

Then, a resin material is inserted into the lens defining cavity 50 via the insertion port 48 to generally fill the interstices between the individual pieces of the filler material. In one embodiment, the resin is poured into the mold 38 and spreads throughout the lens defining cavity due to the force of gravity. This embodiment may be advantageously used, for example, in connection with a low viscosity resin.

In an alternative embodiment of the present invention disclosed herein, resin source 36 is coupled to insertion port 48 (FIG. 5A), and then a vacuum is applied to vents 46. The vacuum causes the resin to be generally evenly distributed within the lens defining cavity 50. As yet a further alternative, the resin from resin source 36 can be pumped into the lens defining cavity 50 via insertion port 52 under pressure. In this embodiment, the air that is located in the interstices between the filler material is displaced by the introduction of resin and vents to atmosphere through the vents 46. As yet a further variation, a low viscosity resin can be premixed with filler, with the resulting mixture being poured or injected into the lens defining cavity 50.

According to a further development of the present invention, it is desirable in some applications to provide certain protection for microwave lens that are manufactured. In one example, a thin film 52 of a suitable material such as, for example, a weatherable polymer is placed into the lens defining cavity 50 of mold 38 before the filler material and resin are introduced therein, a portion of which is shown FIG. 5. In this application, the resin would then bond to the film in addition to the filler material and, therefore, form a unitary mass.

In a further development of the invention, a suitable material such as, for example, a polymer thin film is thermoformed into an exterior shape of a desired microwave lens that is to be formed. This allows, for example, for the thermoformed shape to be utilized in placed of a separate mold. In this regard, the filler material and resin that are used are introduced directly into an interior space of the thermoformed thin film and then allowed to cure to form a unitary mass.

In microwave lens applications, typically it is desired to have the dielectric constant of the material that forms the lens to be as high as possible. This presents a number of distinct advantages such as, for example, allowing a designer to decrease the curvature of the microwave antenna lens for a given application. Similarly, the utilization of different filler materials (such as, for example, microspheres that are formed from a variety of different materials, or hollow or solid microspheres) can be selected in accordance with the dielectric constant requirements of a given application.

In accordance with a further development of the present invention, the dielectric constant of a microwave antenna lens can be relatively finely adjusted by, for example, utilizing a plurality of groups of microspheres, wherein the microspheres in each group have a different diameter. In a still further development of the present invention, microspheres of at least two different diameters can be mixed together in a certain mixing ratio. In this regard, the smaller microspheres will fill in the spaces between the larger spheres. The microspheres should be thoroughly mixed before the microwave antenna lens is formed.

An important criteria in manufacturing microwave antenna lens is that dielectric loss should be minimized. In this regard, most resins that are useful in connection with the present invention disclosed herein (such as, for example, resins that are used in the casting industry) suffer from relatively high dielectric loss factors. As such, and in accordance with a preferred embodiment of the present invention, it is preferable to use microspheres as a filler material for the microwave antenna lens so that the total amount of "lossy" resin is minimized. Once resin that is suitable for use with microspheres from PQ Industries is CR-39 resin from PPG.

A brief summary of how an exemplary process for manufacturing a microwave antenna lens in accordance with certain aspects of the present invention follows. First, a number of ultimate desired design parameters are determined including, among other things, a lens surface radii, a lens thickness, and a predetermined dielectric constant. A mold is provided that has a lens-defining cavity with predetermined dimensions corresponding to the desired design parameters. These dimensions do not allow for significant lens shrinkage after it is removed from the lens-defining cavity.

The lens-defining cavity is substantially filled with a filler that has a predetermined dielectric constant that closely approximates the predetermined dielectric constant. A binding material is introduced into the lens-defining cavity to bind the filler. The binding material occupies an insubstantial volume of the lens-defining cavity as compared to the volume of the lens-defining cavity that is occupied by the. In one example, the binding material occupies no more than about 30% by volume of the lens-defining cavity.

The binding material is cured to form a microwave lens. Relatively insignificant shrinkage of the lens due occurs due, for example, to the insubstantial volume of binding material in the mold cavity. In one example, the amount of shrinkage of the lens is no more than about 2%. This allows, for example, a microwave lens to be produced that has substantially the same parameters as the ultimate desired design parameters, with the filler essentially determining the dielectric constant of the lens.

From the foregoing, it will also be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims when the claims are properly interpreted.

What is claimed is:

1. A method for manufacturing a microwave lens, comprising the steps of:
   providing a mold having a lens defining cavity formed therein;
   filling said lens defining cavity with a predetermined amount of a filler material, said filler material comprising a predetermined amount of individual pieces each of which has a given dielectric constant;
   introducing a binding material into said lens defining cavity so that said binding material generally fills the portion of said lens defining cavity that is not occupied by said filler material; and
   curing said binding material to form a microwave lens, said curing producing the microwave lens having generally the predetermined shape of the surface of the lens mold.

2. The method of claim 1, wherein said filler material comprises microspheres.

3. The method according to claim 2, wherein the ratio of microspheres to the binding material is less than approximately 70 percent by volume.

4. The method of claim 1, wherein said mold comprises a mold base and a mold cover, said mold cover having at least one insertion port.

5. The method of claim 4, wherein said mold cover has at least one exhaust port defined therein that allows air that is present in said lens defining cavity of said mold to be vented to atmosphere.

6. The method of claim 2, wherein said microspheres are formed from a material selected from a group consisting of: glass beads, soda glass beads, alumina, zirconia, and plastic.

7. The method of claim 1, further comprising the step of covering said lens defining cavity of said mold with a polymer before filling said lens defining cavity with said filler material, a unitary mass being formed as said resin is cured.

8. The method of claim 7, wherein said polymer comprises a thin film.

9. The method of claim 1, wherein said mold is formed from a polymer material.

10. The method of claim 9, wherein said step of providing a mold comprises the steps of providing a polymer, and thermoforming said polymer into a predetermined hollow shape.

11. A method for manufacturing a microwave lens, comprising:
    determining ultimate desired design parameters including at least a lens surface radii, thickness, and a predetermined dielectric constant;
    providing a mold having a lens-defining cavity with predetermined dimensions corresponding to said desired design parameters, which dimensions do not allow for significant lens shrinkage after removal of a lens from the cavity;
    substantially filling said lens-defining cavity with a filler having a predetermined dielectric constant that closely approximates said predetermined dielectric constant;
    introducing a binding material into said lens-defining cavity to bind said filler, said binding material occupying an insubstantial volume of the cavity as compared to the volume of said lens-defining cavity that is occupied by said filler; and
    curing said binding material to form a microwave lens, wherein insignificant shrinkage of said the lens due to the insubstantial volume of binding material in the mold cavity, and thereby producing a microwave lens having substantially the ultimate desired design parameters, the filler essentially determining the dielectric constant of the lens.

12. The method defined by claim 11 wherein the binding material occupies no more than about 70% by volume of the cavity after the introducing step.

13. The method defined by claim 11 wherein the amount of shrinkage of the lens after curing is no more than about 2%.

14. The method defined by claim 11 wherein said the filler is selected from the group of materials consisting of sand, grannular quartz, and microspheres.

15. A method for manufacturing a microwave lens, comprising the steps of:
    providing a mold having a lens defining cavity formed therein;
    filling said lens defining cavity with a predetermined amount of a filler material, said filler material comprising a predetermined amount of individual pieces each of which has a given dielectric constant;
    covering said lens defining cavity of said mold with a polymer before filling said lens defining cavity with said filler material;
    introducing a binding material into said lens defining cavity so that said binding material generally fills the portion of said lens defining cavity that is not occupied by said filler material and said polymer; and
    curing said binding material to form a microwave lens, said curing producing the microwave lens having generally the predetermined shape of the surface of the lens mold, wherein a unitary mass is formed as said resin is cured.

16. The method of claim 15, wherein said filler material comprises microspheres.

17. The method according to claim 16, wherein the ratio of microspheres to the binding material is less than approximately 70 percent by volume.

18. The method of claim 15, wherein said mold comprises a mold base and a mold cover, said mold cover having at least one insertion port.

19. The method of claim 18, wherein said mold cover has at least one exhaust port defined therein that allows air that is present in said lens defining cavity of said mold to be vented to atmosphere.

20. The method of claim 16, wherein said microspheres are formed from a material selected from a group consisting of: glass beads, soda glass beads, alumina, zirconia, and plastic.

21. The method of claim 15, wherein said polymer comprises a thin film.

22. A method for manufacturing a microwave lens, comprising:

determining ultimate desired design parameters including at least a lens surface radii, thickness, and a predetermined dielectric constant;

determining a lens surface radii, thickness, and other ultimate desired design parameters, including a predetermined dielectric constant;

providing a mold having a lens-defining cavity with predetermined dimensions corresponding to said desired design parameters, which dimensions do not allow for significant lens shrinkage after removal of a lens from the cavity;

substantially filling said lens-defining cavity with a filler having a predetermined dielectric constant that closely approximates said predetermined dielectric constant;

covering said lens defining cavity of said mold with a polymer before filling said lens defining cavity with said filler material;

introducing a binding material into said lens-defining cavity to bind said filler, said binding material occupying an insubstantial volume of the cavity as compared to the volume of said lens-defining cavity that is occupied by said filler; and curing said binding material to form a microwave lens, wherein insignificant shrinkage of said the lens due to the insubstantial volume of binding material in the mold cavity, and thereby producing a microwave lens having substantially the ultimate desired design parameters, the filler essentially determining the dielectric constant of the lens, and wherein a unitary mass is formed as said resin is cured.

23. The method of claim 22 wherein the binding material occupies no more than about 70% by volume of the cavity after the introducing step.

24. The method of claim 22 wherein the amount of shrinkage of the lens after curing is no more than about 2%.

25. The method of claim 22 wherein said the filler is selected from the group of materials consisting of sand, grannular quartz, and microspheres.

26. The method of claim 22, wherein said polymer comprises a thin film.

* * * * *